(12) United States Patent
Chen et al.

(10) Patent No.: US 7,448,584 B2
(45) Date of Patent: Nov. 11, 2008

(54) WALL MOUNTING MONITOR BRACKET (75) Inventors: Wen-Chun Chen, Tao Yuan (TW); Ming-Chin Huang, Tao Yuan (TW)

(73) Assignee: Hoolin Research Company Limited, Tao Yuan (TW)

( * ) Notice: Subject to any disclaimer, the term of this patent is extended or adjusted under 35 U.S.C. 154(b) by 134 days.

(21) Appl. No.: 11/482,739

(22) Filed: Jul. 10, 2006

(65) Prior Publication Data
US 2008/0006751 A1    Jan. 10, 2008

(51) Int. Cl.
E04G 3/00    (2006.01)

(52) U.S. Cl. .............. 248/278.1; 248/274.1; 248/284.1; 248/288.11; 248/122.1; 248/125.7; 248/125.9; 248/917; 248/918; 248/919; 248/920; 248/921; 248/923; 248/227.2; 248/228.8; 248/214; 248/215; 248/282.1; 361/681; 361/682

(58) Field of Classification Search .............. 248/274.1, 248/282.1, 284.1, 288.11, 122.1, 125.7, 125.9, 248/917, 918, 919, 920, 921, 923, 227.2, 248/228.8, 214, 215, 278.1; 361/681, 682
See application file for complete search history.

(56) References Cited

U.S. PATENT DOCUMENTS

| | | | | |
|---|---|---|---|---|
| 5,201,896 A | * | 4/1993 | Kruszewski | 248/278.1 |
| 5,695,078 A | * | 12/1997 | Otema | 211/103 |
| 5,743,503 A | * | 4/1998 | Voeller et al. | 248/284.1 |
| 5,857,577 A | * | 1/1999 | Thomas et al. | 211/94.01 |
| 6,367,756 B1 | * | 4/2002 | Wang | 248/278.1 |
| 6,478,274 B1 | * | 11/2002 | Oddsen, Jr. | 248/274.1 |
| 6,695,270 B1 | * | 2/2004 | Smed | 248/274.1 |
| 6,857,610 B1 | * | 2/2005 | Conner et al. | 248/284.1 |
| 6,863,252 B2 | * | 3/2005 | Bosson | 248/278.1 |
| 6,923,413 B2 | * | 8/2005 | Dozier | 248/294.1 |
| 7,000,878 B2 | * | 2/2006 | Lin | 248/276.1 |
| 7,028,961 B1 | * | 4/2006 | Dittmer et al. | 248/278.1 |
| 7,207,537 B2 | * | 4/2007 | Hung | 248/284.1 |
| 7,243,892 B2 | * | 7/2007 | Pfister | 248/371 |
| 7,246,780 B2 | * | 7/2007 | Oddsen, Jr. | 248/282.1 |
| 7,264,212 B2 | * | 9/2007 | Hung | 248/282.1 |
| 7,300,029 B2 | * | 11/2007 | Petrick et al. | 248/285.1 |
| 2004/0262474 A1 | * | 12/2004 | Boks et al. | 248/276.1 |
| 2006/0175499 A1 | * | 8/2006 | Price et al. | 248/278.1 |
| 2007/0023593 A1 | * | 2/2007 | Fedewa | 248/201 |
| 2007/0041150 A1 | * | 2/2007 | Short et al. | 361/681 |

* cited by examiner

*Primary Examiner*—Anita M. King
*Assistant Examiner*—Nkeisha J Dumas
(74) *Attorney, Agent, or Firm*—Troxell Law Office, PLLC (57) ABSTRACT

A wall mounting monitor bracket comprises a sliding base means, at least a movable arm means, and at least a connection means. The movable arm means is hung on the sliding base means via one end, and connected to the connection means via the other end. The other end of the connection means is attached to a first monitor. By adjusting the movable arm means and the connection means, the first monitor can be firmly and easily adjusted to different angles.

2 Claims, 9 Drawing Sheets

WALL MOUNTING MONITOR BRACKET

FIELD OF THE INVENTION

The present invention relates to a monitor bracket, and more particularly to a wall mounting monitor bracket that firmly and easily adjusts a monitor to different angles by adjusting a movable arm means and a connection means.

BACKGROUND OF THE INVENTION

The commercial monitor bracket is generally composed of two parts including a base disposed on the table and an angle-adjustable movable arm coupled with the base, wherein a monitor is fixed on one end of the movable arm such that the monitor can be disposed stably and the monitor's angle is adjustable.

However, the drawbacks existing in angle adjustment and integral assembly of the conventional monitor bracket are listed as follows:

1. In the process of coupling a plug of a computer machine with the monitor, the monitor or the movable arm must be detached first since the elevational angle of the monitor is not adjustable, causing the inconvenience to the user.

2. An accidental fall of the bracket including the monitor fixed thereon from the table may be caused easily by shifting the bracket or impacting the bracket incautiously, so it is unsteady and not safe enough.

3. The adjustment of the movable arm is confined to specific angles so the adjustable angle is incomplete, causing the inconvenience to the user.

SUMMARY OF THE INVENTION

It is a main object of the present invention to provide a wall mounting monitor bracket for firmly and easily adjusting the monitor to different angles.

In order to achieve the above object, a wall mounting monitor bracket comprises a sliding base means, at least a movable arm means, and at least a connection means. The movable arm means is hung on the sliding base means via one end, and connected to the connection means via the other end. The other end of the connection means is attached to a first monitor. By adjusting the movable arm means and the connection means, the first monitor can be firmly and easily adjusted to different angles.

DETAILED DESCRIPTION OF THE PREFERRED EMBODIMENT

Referring to FIGS. 1 through 5, a first preferred embodiment of a wall mounting monitor bracket of the present invention comprising a sliding base means 1, a movable arm means 2, and a connection means 3 is shown.

Figure 1:
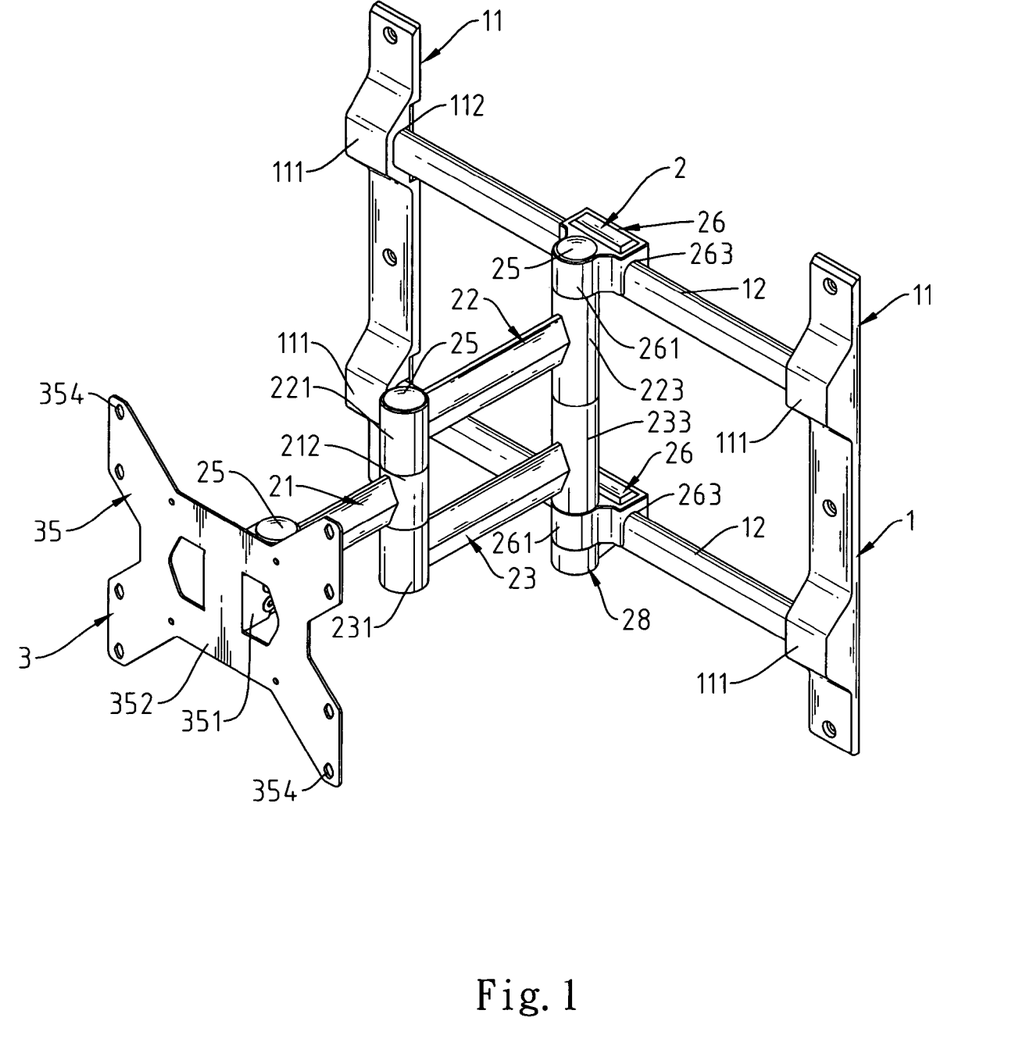
FIG. 1 is an elevational view of a first preferred embodiment of the present invention.
Figure 2:
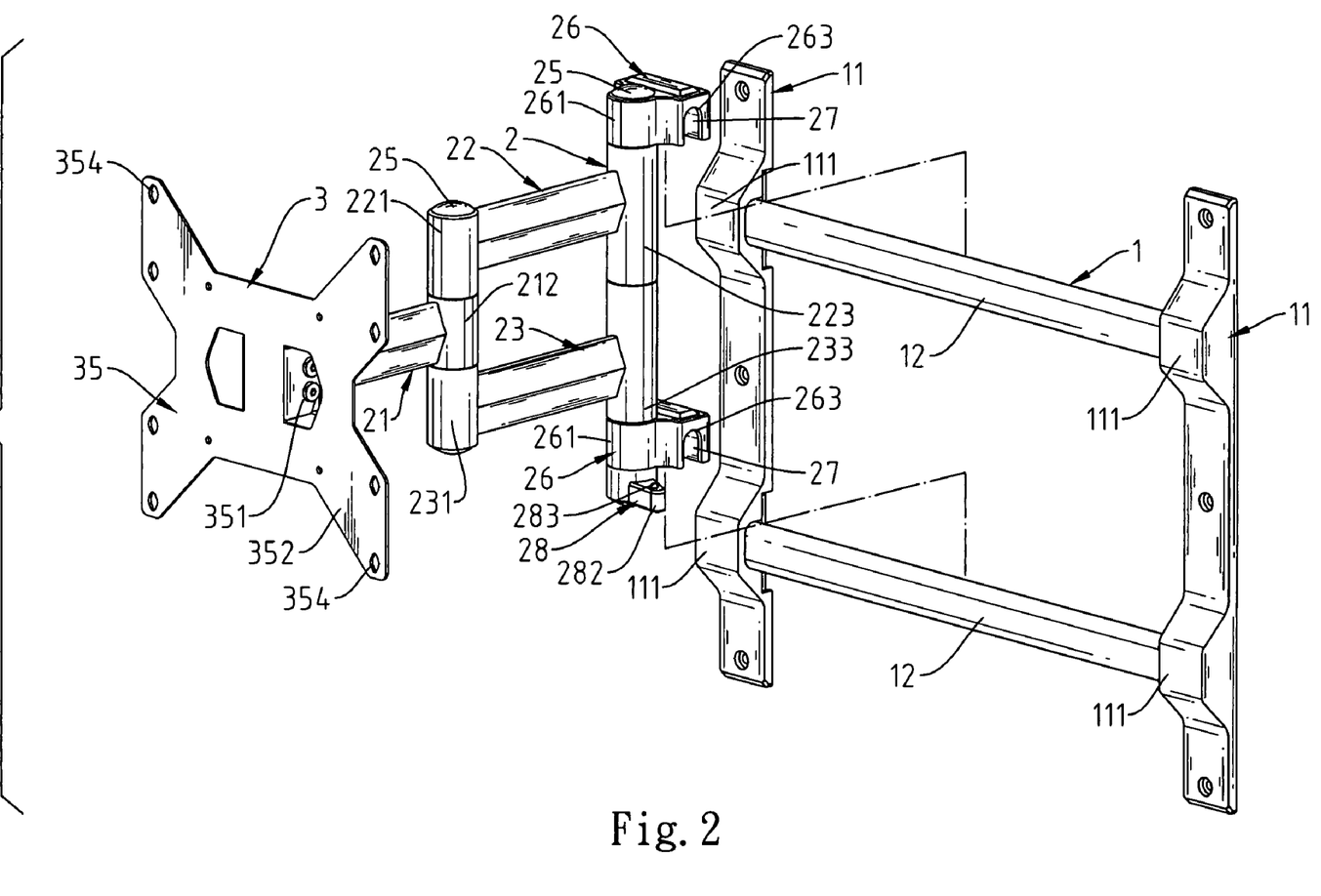
FIG. 2 is elevational, exploded view of the first preferred embodiment of present invention.

The sliding base means 1 comprises several fixing bases 11 and several sliding rods 12. The fixing bases 11 are fixed on the wall, and each fixing base 11 comprises several holding parts 111, wherein each holding part 111 has a holding trench 112 on one side. Each aforesaid sliding rod 12 has two ends held in the holding trenches 112, respectively.

Figure 3:
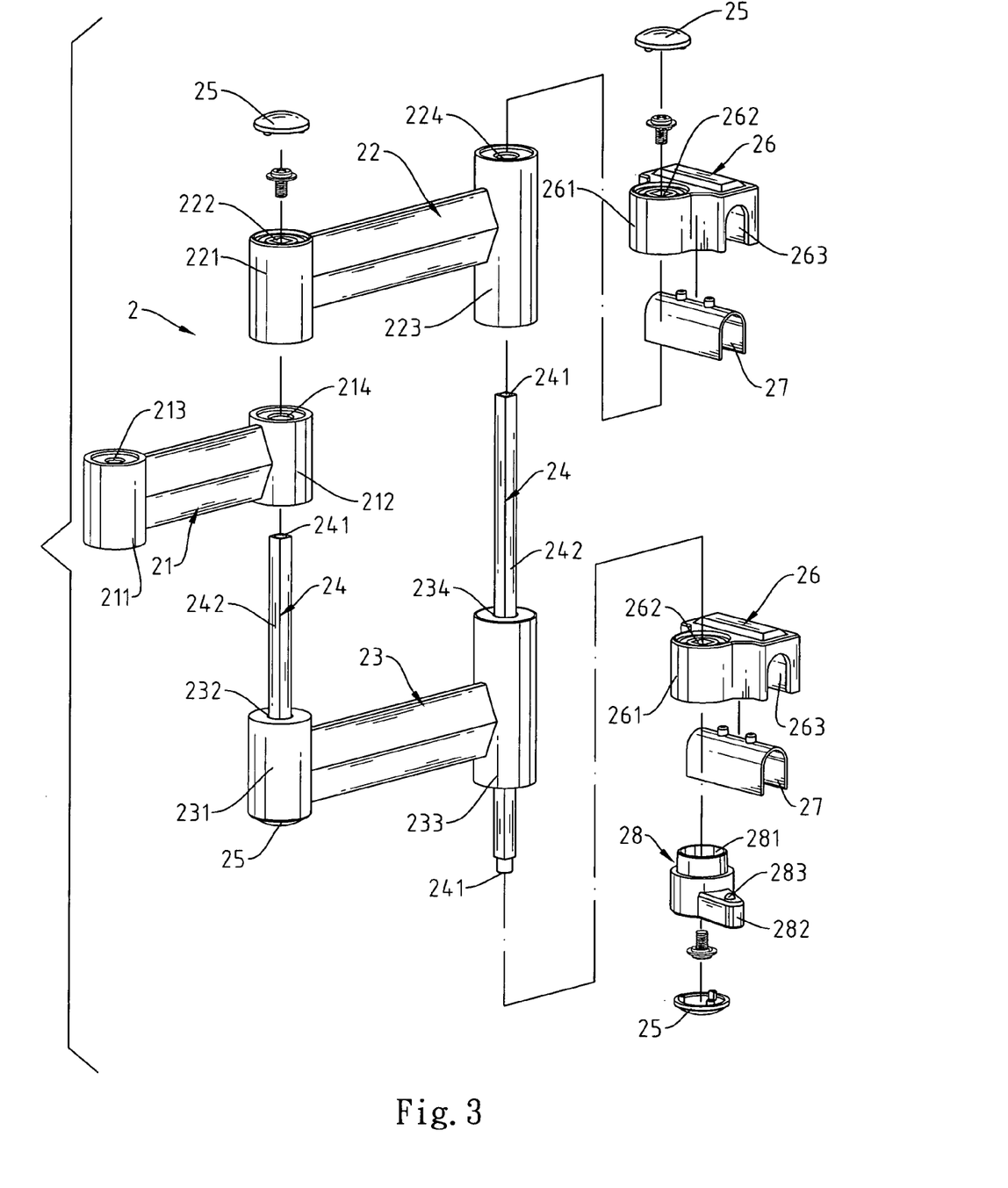
FIG. 3 is elevational, exploded view of the movable arm means of the first preferred embodiment of present invention.

The movable arm means 2 is movably hung on the aforesaid sliding rods 12, and the movable arm means 2 comprises a first movable arm 21, a second movable arm 22, a third movable arm 23, several rotating shafts 24, several decorative devices 25, several axial connecting bases 26, several sliding bushings 27, and at least a wedging device 28.

The first movable arm 21 has a first shaft sleeve 211 and a second shaft sleeve 212 on both ends, respectively. The first shaft sleeve 211 and the second shaft sleeve 212 have a through hole 213 and a first circular hole 214 respectively axially penetrating through the center regions. The second movable arm 22 has a third shaft sleeve 221 on one end, wherein the third shaft sleeve 221 has a first square hole 222 axially penetrating through the center region thereof.

The second movable arm 22 further has a fourth shaft sleeve 223 on the other end, wherein the fourth shaft sleeve 223 has a second circular hole 224 axially penetrating through the center region.

The third movable arm 23 has a fifth shaft sleeve 231 on one end, wherein the fifth shaft sleeve 231 has a second square hole 232 axially penetrating through the center region. The third movable arm 23 has a sixth shaft sleeve 233 on the other end, wherein the sixth shaft sleeve 233 has a third circular hole 234 axially penetrating through the center region.

The rotating shaft 24 has a respective locking hole 241 on each end. The rotating shaft 24 has a polygonal coupling part 242 between these two locking holes 241 corresponding to the first square hole 222 and the second square hole 232.

Each aforesaid axial connecting base 26 has a seventh shaft sleeve 261 on one side, wherein the seventh shaft sleeve 261 has a third square hole 262 axially penetrating through the center region corresponding to the polygonal coupling part 242. Each axial connecting base 26 has a slot 263 for fixedly connecting with sliding bushing 27.

The wedging device 28 has an axial penetrating through hole 281 and a circularly laterally extending wedging part 282. The wedging part 282 has a positioning pin 283 protruding from one surface. The second shaft sleeve 212 is pivotally connected between the third shaft sleeve 221 and the fifth shaft sleeve 231 via the rotating shaft 24. The coupling part 242 of the rotating shaft 24 is inserted through the first circular hole 214 to allow the free rotation of the second shaft sleeve 212, and the coupling part 242 is inserted correspondingly through the first square hole 222 and the second square hole 232 to immovably position the first square hole 222 and the second square hole 232, whereby the locking holes 241 on both ends of the rotating shaft 24 are screwed between the first square hole 222 and the second square hole 232. The outer sides of the first square hole 222 and the second square hole 232 are covered with the decorative devices 25, respectively.

The aforesaid fourth shaft sleeve 223 is pivotally connected with the sixth shaft sleeve 233 via another rotating shaft 24. In addition, the both ends of the rotating shaft 24 that penetrates through the fourth shaft sleeve 223 and the sixth shaft sleeve 233 are pivotally connected with the axial connecting bases 26, respectively.

The coupling part 242 of one of the two rotating shafts 24 is inserted correspondingly through the third square holes 262 of two axial connecting bases 26 to immovably position the axial connecting bases 26. The slots 263 of these two axial connecting bases 26 are fixedly connected to two sliding bushings 27, respectively.

The axial connecting base 26 on the outer side of the sixth shaft sleeve 233 is further pivotally connected to the wedging device 28. The locking holes 241 on both ends of the rotating shaft 24 are screwed between the third square hole 262 and the through hole 281. The outer sides of the third square hole 262 and the through hole 281 are covered with the decorative devices 25, respectively. The aforesaid axial connecting bases 26 are hung on one side of the aforesaid sliding rods 12 via the slots 263 and the sliding bushings 27, and the wedging device 28 is rotated to posit the wedging part 282 and the positioning pin 283 on the other side of the sliding rods 12 for buckling the axial connecting bases 26 to the sliding rods 12.

Figure 4:
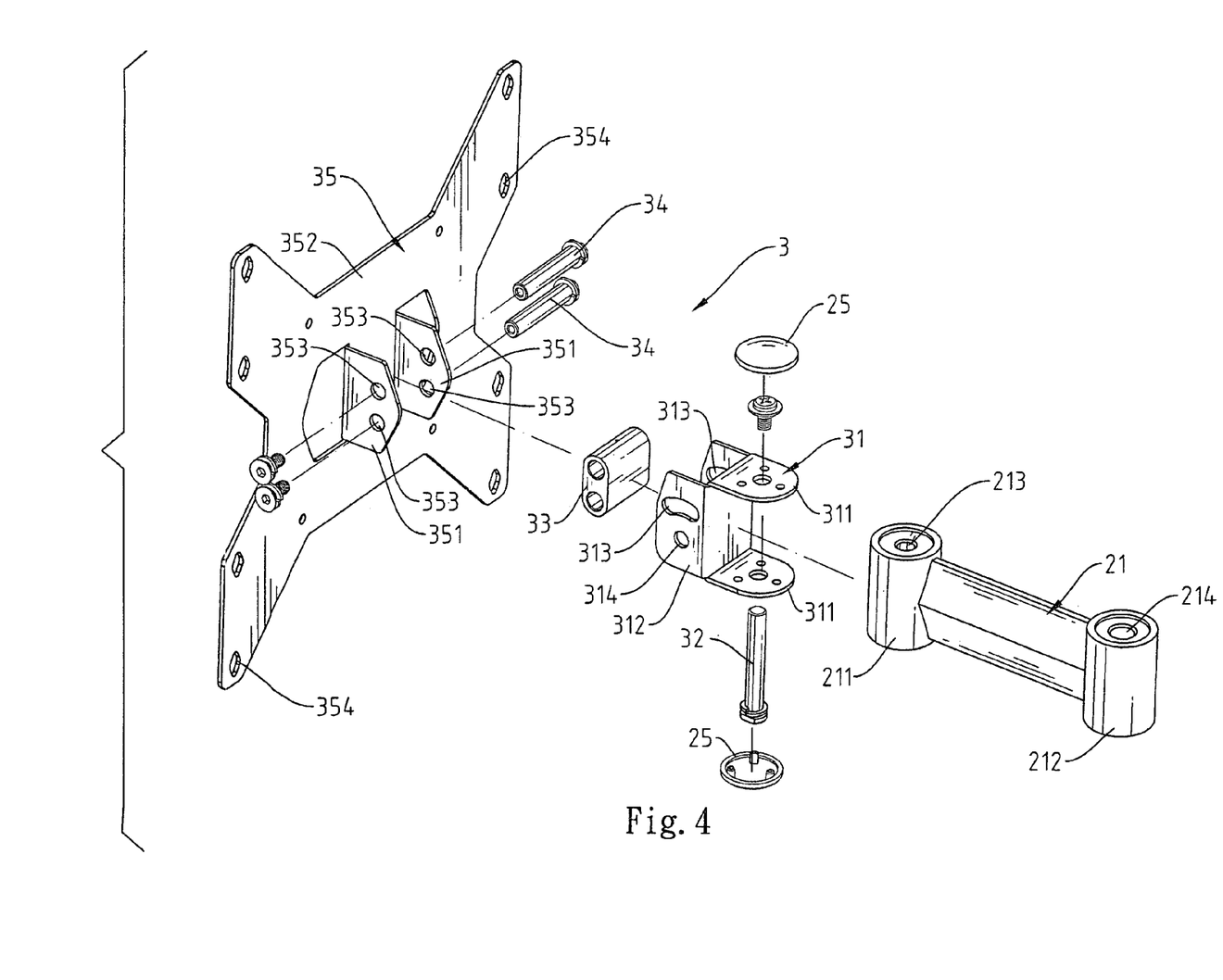
FIG. 4 is elevational, exploded view of the connection means of the first preferred embodiment of present invention.
Figure 5:
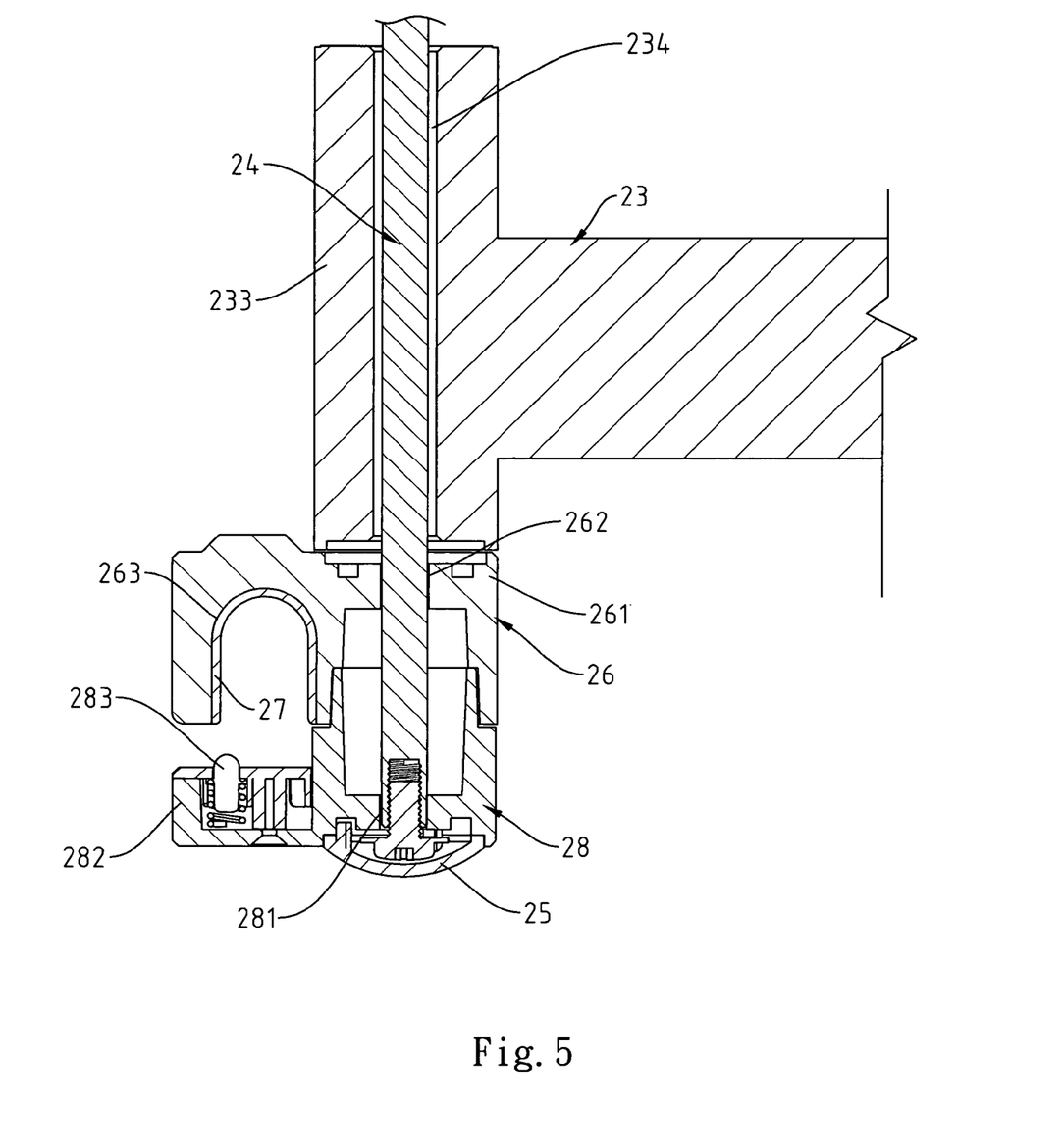
FIG. 5 is partial, cross-sectional view of the first preferred embodiment of present invention.

The connection means 3 is connected to the front end of the movable arm means 2, and the connection means 3 comprises a rotating shaft base 31, a first pivotal pin 32, a sleeve 33, several second pivotal pins 34, and a monitor fixing frame 35.

The rotating shaft base 31 has two first connecting parts 311 and two second connecting parts 312, and the rotating shaft base 31 further has sliding trenches 313 and center holes 314 penetrating through the second connecting parts 312.

The monitor fixing frame 35 has several first assembling parts 351, a second assembling part 352, several first assembling holes 353 penetrating through the first assembling parts 351, and several second assembling holes 354 penetrating through the surfaces of the second assembling part 352.

The aforesaid first shaft sleeve 211 is pivotally held between these two first connecting parts 311 via the first pivotal pin 32. The both ends of the first pivotal pin 32 are covered with the decorative devices 25, respectively. The sleeve 33 is held between these two second connecting parts 312. The respective sides of these two second connecting parts 312 are located beside the first assembling parts 351. These first assembling holes 353 on the first assembling part 351 are located corresponding to the sliding trenches 313 and the center holes 314. The second pivotal pins 34 are inserted through the sliding trenches 313, the center holes 314, and the sleeve 33, and pivotally connected to the first assembling parts 351. The second assembling part 352 is screwed onto a first monitor 4 (shown in FIG. 6) by means of the second assembling holes 354.

Figure 6:
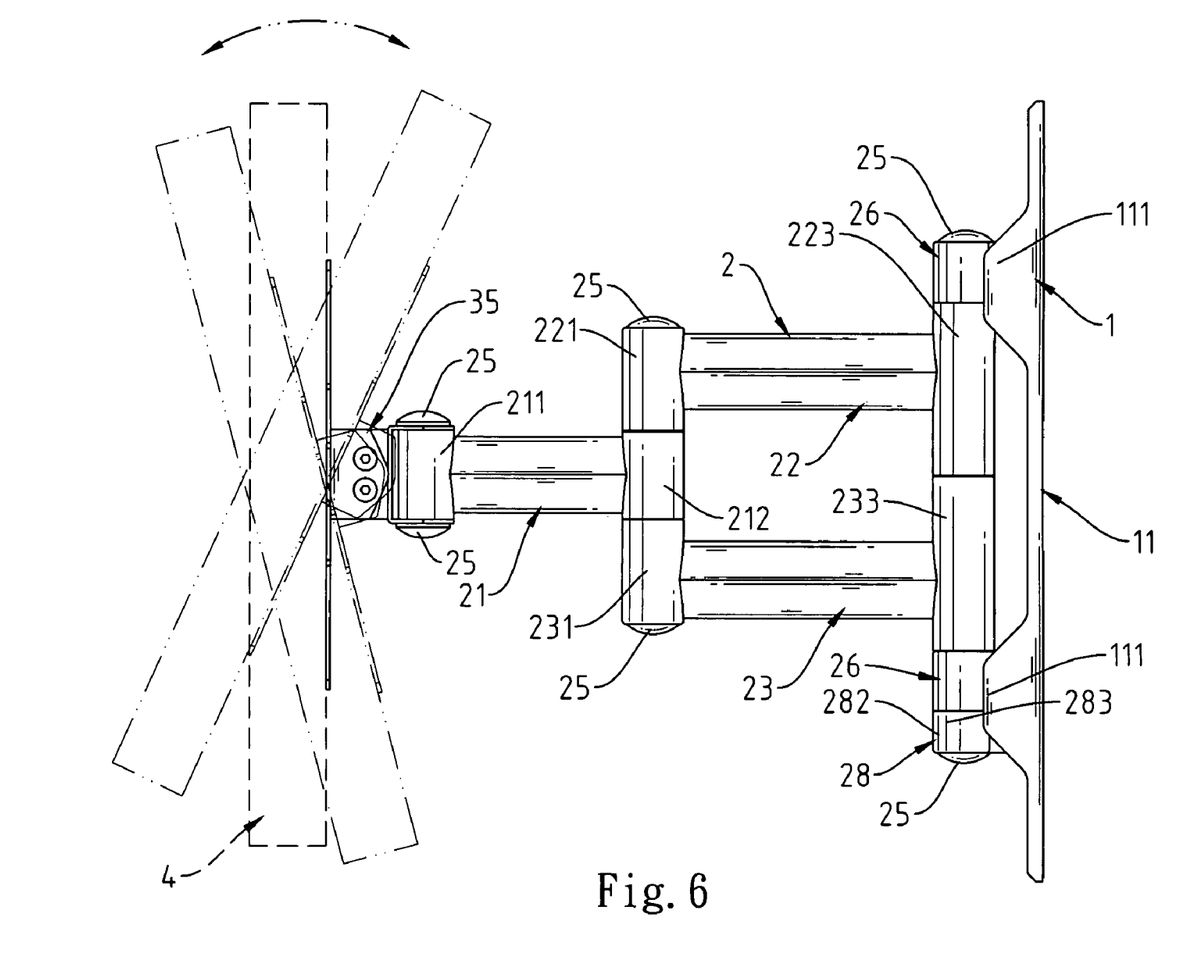
FIG. 6 is schematic view showing the operation of the first preferred embodiment of present invention.
Figure 7:
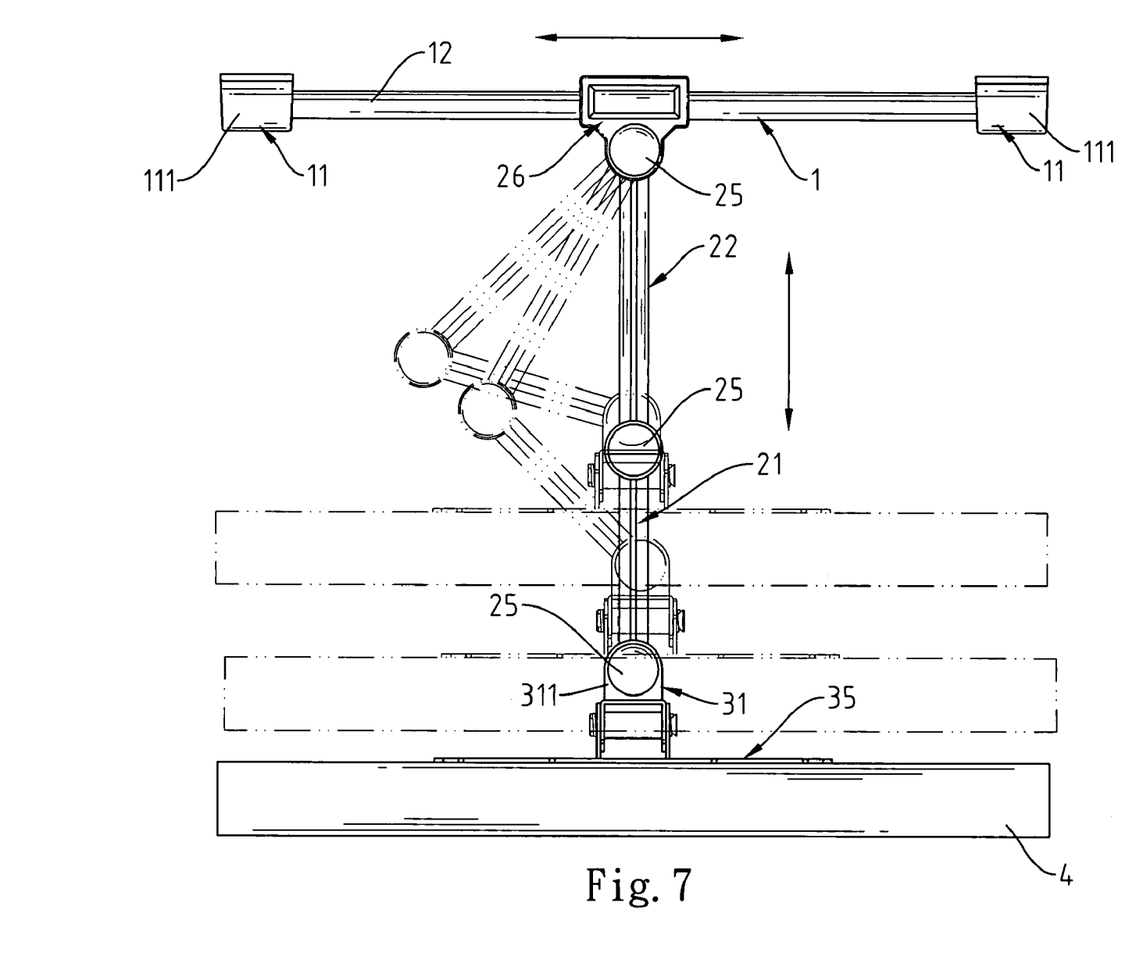
FIG. 7 is schematic view showing another operation of the first preferred embodiment of present invention.

The operations of the aforesaid means are shown in FIG. 6 and FIG. 7. According to the wall mounting monitor bracket of the present invention, the first monitor 4 is fixed on the monitor fixing frame 35, and the elevational angle of the first monitor 4 is adjustable by means of the sliding trenches 313. The rotating shaft base 31 is pivotally connected to the front end of the first movable arm 21. The rear end of the first movable arm 21 is pivotally connected the front ends of the second movable arm 22 and the third movable arm 23. The axial connecting bases 26 are respectively connected to the sliding rods 12. By rotating the first movable arm 21, the second movable arm 22, and the third movable arm 23, the horizontal angle of the first monitor 4 is adjustable, and the fist monitor 4 is shiftable leftward or rightward by shifting the axial connecting base 26.

By using the aforesaid operations, the angle of the first monitor 4 is highly changeable.

Figure 8:
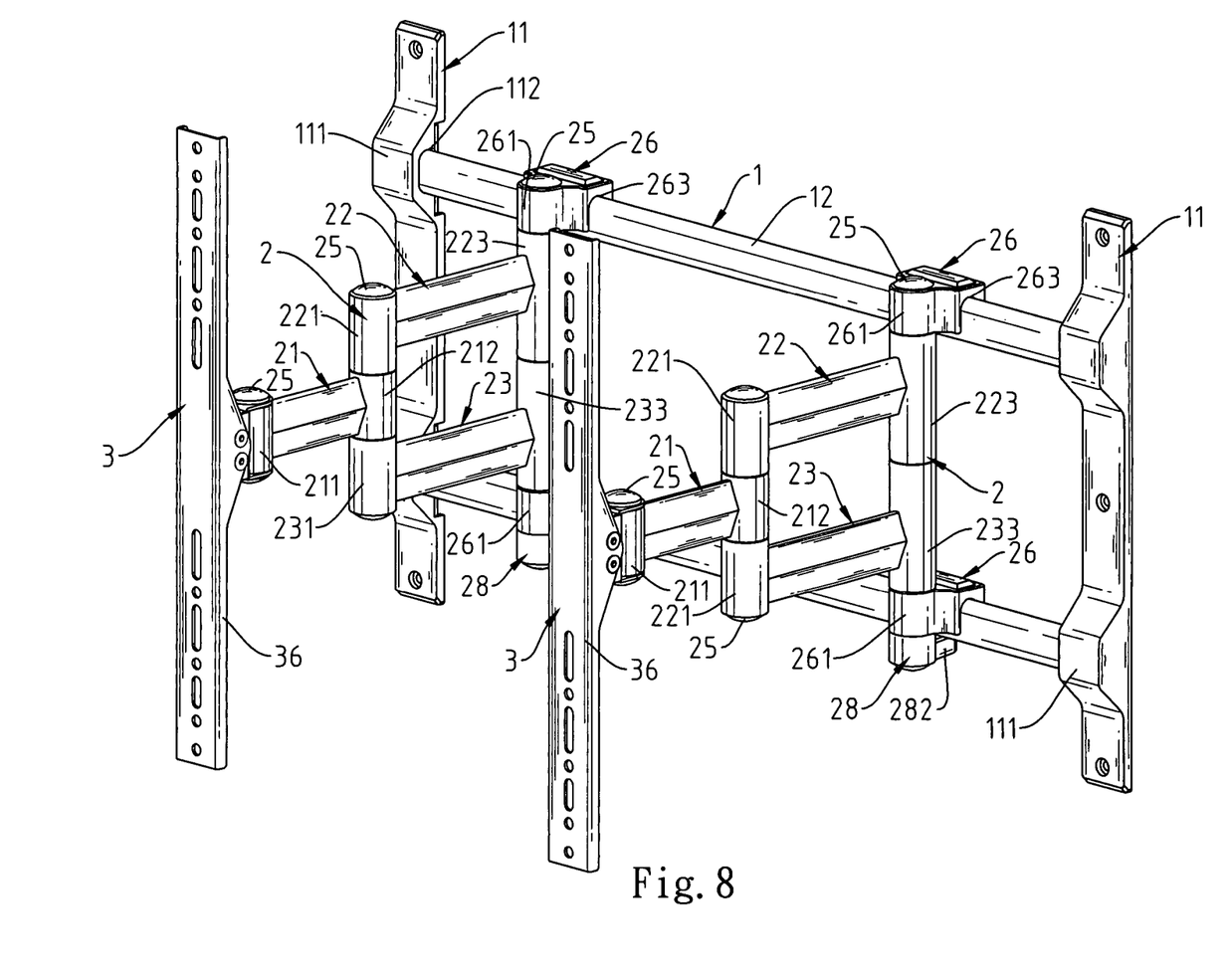
FIG. 8 is an elevational view of a second preferred embodiment of the present invention.
Figure 9:
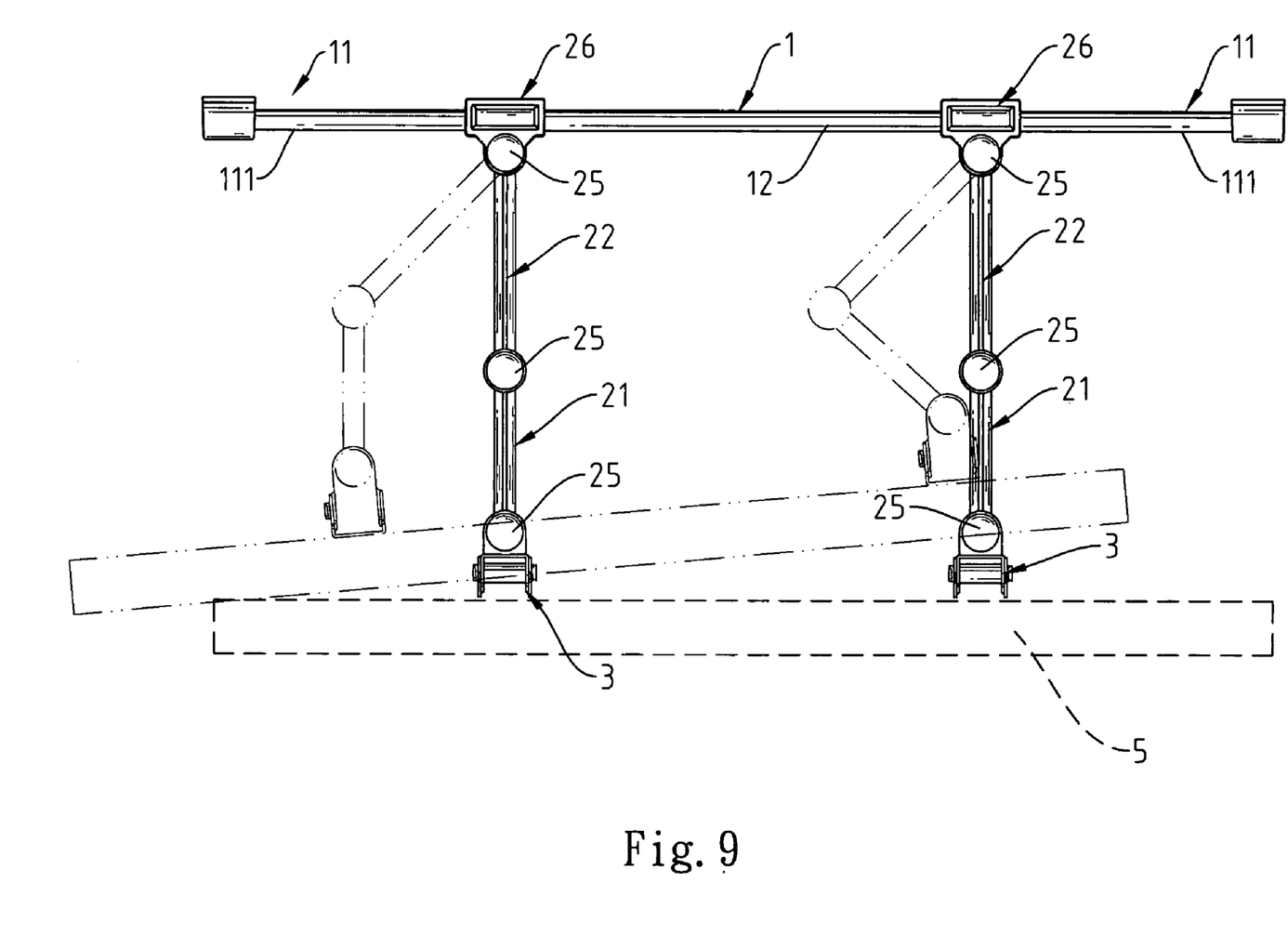
FIG. 9 is schematic view showing the operation of the second preferred embodiment of present invention.

Referring to FIG. 8 and FIG. 9, a second preferred embodiment of the present invention is shown. The second preferred embodiment is suitable for use in a large-sized monitor. The second preferred embodiment and the first preferred embodiment have substantially identical structures. The difference is that the second preferred embodiment has at least a movable arm means 2 and at least a connection means 3, wherein the connection means 3 comprises a rotating shaft base 31, a first pivotal pin 32, a sleeve 33, several second pivotal pins 34, and a monitor fixing frame 36. The monitor fixing frame 36 is fixed on a second monitor 5, whereby several movable arm means 2 and several connection means 3 provide the second monitor 5 with a stronger supporting force.

What the invention claimed is:

1. A wall mounting monitor bracket comprising:
   a sliding base means comprising a plurality of fixing bases and a plurality of sliding rods, each of said sliding rods having both ends respectively held in said fixing bases;
   at least a movable arm means for being movably hung on said sliding rods, and said movable arm means comprising a first movable arm, a second movable arm, a third movable arm, a plurality of rotating shafts, and a plurality of axial connecting bases, said first movable arm having a first shaft sleeve and a second shaft sleeve located on opposing ends thereof, said second movable arm having a third shaft sleeve and a fourth shaft sleeve located on opposing ends thereof, said third movable arm has a fifth shaft sleeve and a sixth shaft sleeve located on opposing ends thereof, each of said axial connecting bases has a seventh shaft sleeve on one side and a slot, said second shaft sleeve being free-rotatably and pivotally connected between said third shaft sleeve and said fifth shaft sleeve, said fourth shaft sleeve being pivotally connected with said sixth shaft sleeve via a first rotating shaft of said rotating shafts, the first rotating shaft has two ends pivotally respectively connected to said axial connecting bases, said slots being respectively hung on said sliding rods, said fourth shaft sleeve and said sixth shaft sleeve being freely rotatable; and
   a connection means connected to a front end of said movable arm means, said connection means comprising a rotating shaft base and a monitor fixing frame for being fixed on a monitor, said first shaft sleeve being pivotally connected to one side of said rotating shaft base, said monitor fixing frame being pivotally connected to the other side of said rotating shaft base,
   wherein said movable arm means has a plurality of sliding bushings fixed on said slots of said axial connecting bases, respectively.

2. A wall mounting monitor bracket comprising:
   a sliding base means comprising a plurality of fixing bases and a plurality of sliding rods, each of said sliding rods having both ends respectively held in said fixing bases;
   at least a movable arm means for being movably hung on said sliding rods, and said movable arm means comprising a first movable arm, a second movable arm, a third movable arm, a plurality of rotating shafts, and a plurality of axial connecting bases, said first movable arm having a first shaft sleeve and a second shaft sleeve located on opposing ends thereof, said second movable arm having a third shaft sleeve and a fourth shaft sleeve located on opposing ends thereof, said third movable arm has a fifth shaft sleeve and a sixth shaft sleeve located on opposing ends thereof, each of said axial connecting bases has a seventh shaft sleeve on one side and a slot, said second shaft sleeve being free-rotatably and pivotally connected between said third shaft sleeve and said fifth shaft sleeve, said fourth shaft sleeve being pivotally connected with said sixth shaft sleeve via a first rotating shaft of said rotating shafts, the first rotating shaft has two ends pivotally respectively connected to said axial connecting bases, said slots being respectively hung on said sliding rods, said fourth shaft sleeve and said sixth shaft sleeve being freely rotatable; and a connection means connected to a front end of said movable arm means, said connection means comprising a rotating shaft base and a monitor fixing frame for being fixed on a monitor, said first shaft sleeve being pivotally connected to one side of said rotating shaft base, said monitor fixing frame being pivotally connected to the other side of said rotating shaft base, wherein said movable arm means has a wedging device pivotally connected to an outer end of one of said axial connecting bases for buckling said axial connecting bases to said sliding rods.

* * * * *